United States Patent [19]

Siegel et al.

[11] 4,238,093
[45] Dec. 9, 1980

[54] AIRCRAFT LAUNCHER

[75] Inventors: Moses Siegel, Cheltenham, Pa.; Everett Cahall, Medford; David Dunning, Bayville, both of N.J.; Joseph Hammond, Cornwells Heights, Pa.

[73] Assignee: The United States of America as represented by the Secretary of the Navy, Washington, D.C.

[21] Appl. No.: 972,133

[22] Filed: Dec. 21, 1978

[51] Int. Cl.³ .............................................. B64F 1/06
[52] U.S. Cl. ........................................ 244/63; 46/81
[58] Field of Search ............... 244/63; 46/81; 124/56, 124/60, 61, 65

[56] References Cited

U.S. PATENT DOCUMENTS

| | | | |
|---|---|---|---|
| 1,777,167 | 9/1930 | Forbes | 244/63 |
| 1,960,264 | 5/1934 | Heinkel | 244/63 |
| 2,515,205 | 7/1950 | Fieux | 244/63 |
| 3,433,438 | 3/1969 | Cruger et al. | 244/63 |

*Primary Examiner*—Charles E. Frankfort
*Attorney, Agent, or Firm*—R. S. Sciascia; Henry Hansen; Armand M. Vozzo, Jr.

[57] ABSTRACT

A launching system for lightweight aircraft includes a shuttle adapted to carry the aircraft and slidingly mounted to a launching frame along a track that guides launch direction. A piston rod is concentrically mounted within a launch tube parallel to the track and is adapted to receive pneumatic pressure at the inward end thereof for driving the rod longitudinally outward of the tube during the launch stroke of the system. A crosshead having a pair of rotatable sheaves mounted thereon is rigidly connected to the outward end of the piston rod and slidingly connected to the track so that the crosshead moves along the track in conjunction with the longitudinal movement of the rod. A length of energy-absorbing tape is fixed at its ends to the frame, reeved around the sheaves, and passed through the shuttle between a pair of opposed arcuate members centrally mounted thereto so that during the launch stroke, the shuttle is accelerated along the track from a battery position by a towing force applied by the tape and symmetrically distributed about the forward arcuate member to prevent jamming of the shuttle along the track. At the end of the launch stroke, the tape, acting upon the rearward arcuate member, serves as an energy absorber to brake the shuttle, piston rod, and crosshead for a return to battery position.

4 Claims, 11 Drawing Figures

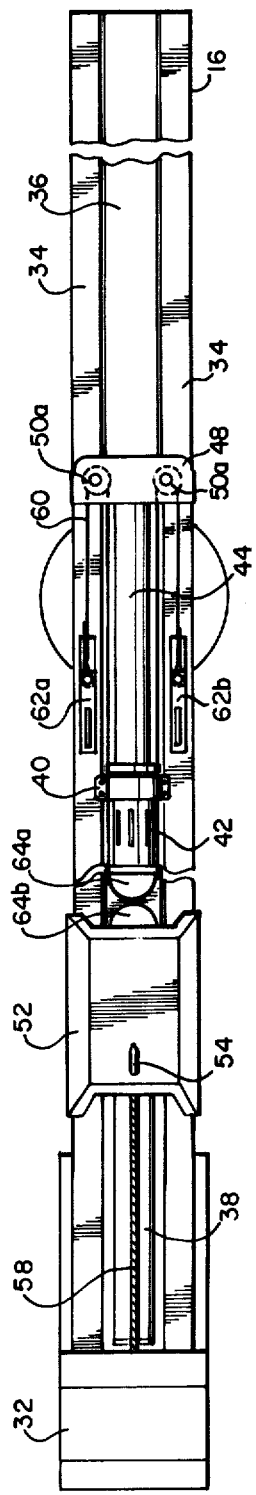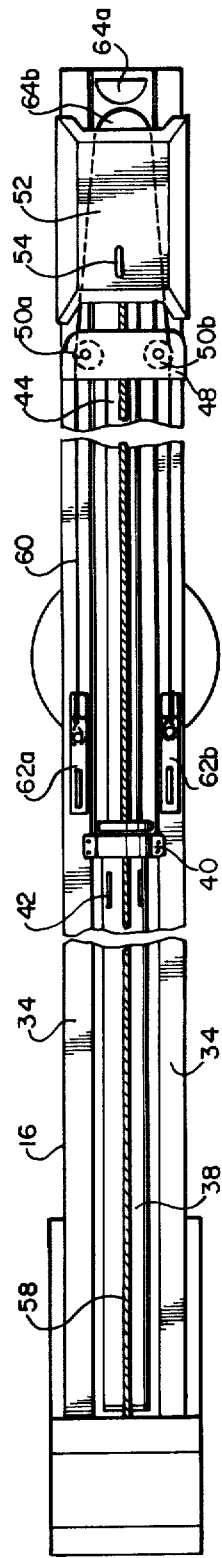
FIG. 2A
FIG. 2B

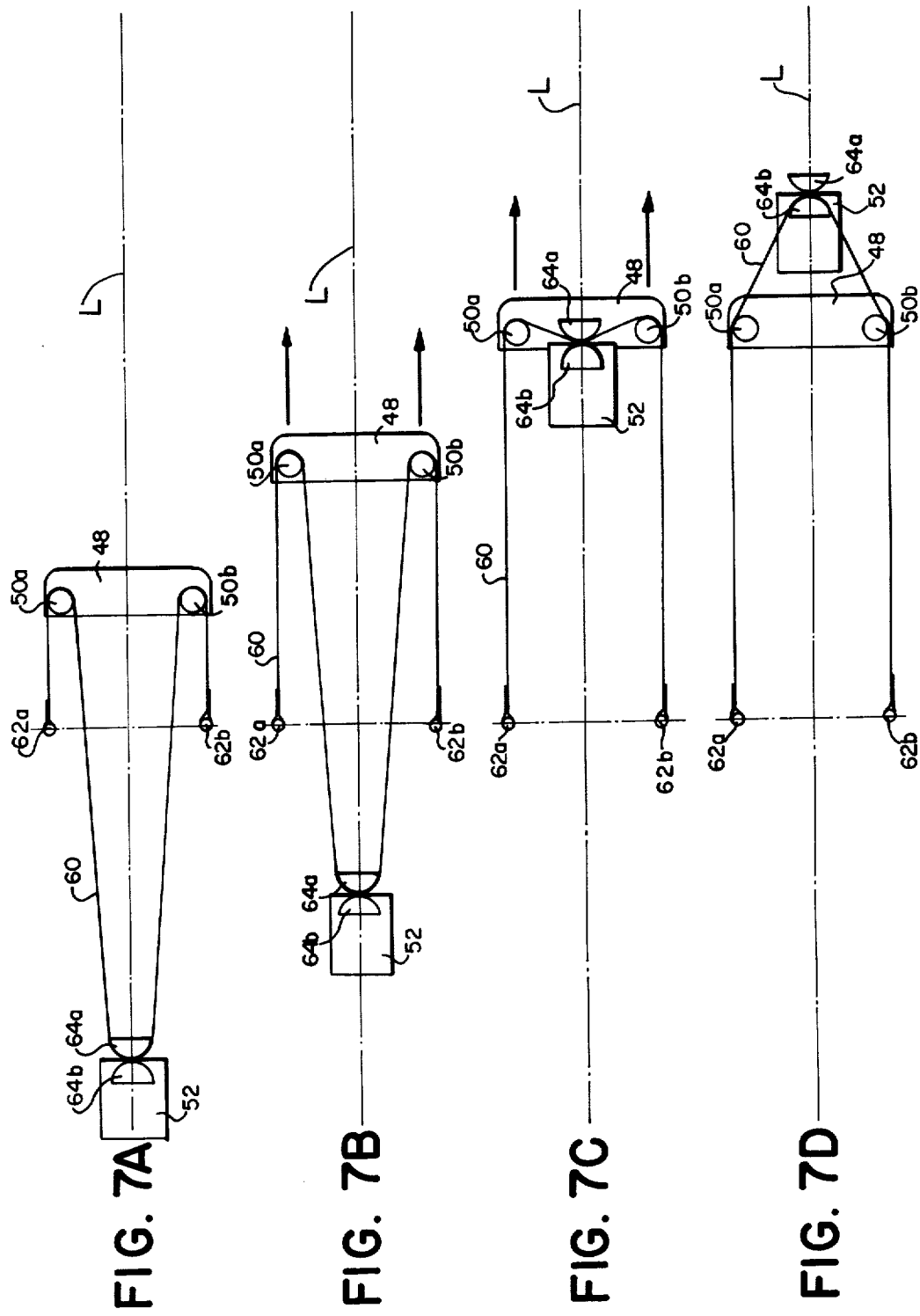

4,238,093

AIRCRAFT LAUNCHER

STATEMENT OF GOVERNMENT INTEREST

The invention described herein may be manufactured and used by or for the Government of the United States of America for governmental purposes without the payment of any royalites thereon or therefor.

BACKGROUND OF THE INVENTION

The present invention relates to vehicle accelerating systems and more particularly to an improved launching device for lightweight aircraft.

Launching systems for lightweight aircraft require the guided acceleration of the aircraft from rest over a relatively short distance and generally involve moving the aircraft along a track at a high rate of speed in accordance with the forward translation of a powered piston member. These systems employ numerous types of carriages guided along the track and coupled to the piston member by various means to accelerate the aircraft to launch speed. After launching the aircraft, these systems arrest their unlaunched moving parts, including the carriage and piston member, by a variety of energy-absorbing means independent of its launching mechanism.

Problems have arisen in the use of these launching systems both in the initial launching stage and in the subsequent braking phase. In the launching stage, despite their guided engagement to the track, the carriages tend to jam along the track during the launch stroke preventing smooth uninterrupted acceleration. In the braking phase of operation, effective arrestment of the carriage, piston member, and other unlaunched moving parts has not been satisfactorily attained without the incorporation of completely independent braking devices which complicate the operation of the systems and add parasitic inertia launch loads.

Existing launching systems have not adequately resolved these problems associated with guide acceleration in the launch stroke and simple yet reliable kinetic energy absorption in the braking phase of operation. Although numerous launchers have been developed and have generally been satisfactory in performance, they have not been particularly adequate in preventing jam-free travel of the moving carriage during the launch stroke and in effectively arresting the unlaunched moving parts without a completely separate brake system. Furthermore, existing launchers have been relatively complicated, heavy, and expensive to manufacture.

SUMMARY OF THE INVENTION

Accordingly, it is a general purpose and object of the present invention to provide an improved launching system for lightweight aircraft wherein the aircraft is accelerated in a smooth uninterrupted manner for a more efficient and reliable launch.

Another object of the present invention is to provide an efficient aircraft launcher in which the unlaunched moving parts are effectively arrested after launch of the aircraft without a completely separate brake system.

A further object of the present invention is to provide an aircraft launching system with a built-in braking capability that is simple yet reliable and which is lightweight and easy to maneuver.

A still further object of the present invention is to provide a simple and dependable launcher for lightweight aircraft which is durable in structure and economical to manufacture.

Briefly, these and other objects of the present invention are accomplished by a launching system for lightweight aircraft including a shuttle adapted to carry the aircraft and slidingly mounted to a launching frame along a track that guides launch direction. A piston rod is concentrically mounted within a launch tube parallel to the track and is adapted to receive pneumatic pressure at the inward end thereof for driving the rod longitudinally outward of the tube during the launch stroke of the system. A crosshead having a pair of rotatable sheaves mounted thereon is rigidly connected to the outward end of the piston rod and slidingly connected to the track so that the crosshead moves along the track in conjunction with the longitudinal movement of the rod. A length of energy-absorbing tape is fixed at its ends to the frame, reeved around the sheaves, and passed through the shuttle between a pair of opposed forward and rearward arcuate members centrally mounted thereon. During the launch stroke, the shuttle is accelerated from a battery position by a towing force evenly distributed by the tape about the forward arcuate member so that jamming of the shuttle along the track is prevented. At the end of the launch stroke, the tape, acting upon the rearward arcuate member, serves as an energy absorber to brake the shuttle, piston rod, and crosshead for a return to battery position.

For a better understanding of these and other aspects of the present invention, reference may be made to the following detailed description taken in conjunction with the accompanying drawings in which like reference numerals designate like parts throughout the figures thereof.

BRIEF DESCRIPTION OF THE DRAWINGS

FIGS. 2A and 2B are top plan views, respectively, of the launcher of FIG. 1 in battery position prior to launch, and in braked position after launch;

FIGS. 7A through 7D are schematic plan views of the launcher showing relative movement of the shuttle and crosshead from the battery position of FIG. 2A to the braked position of FIG. 2B.

DESCRIPTION OF THE PREFERRED EMBODIMENT

Figure 1:
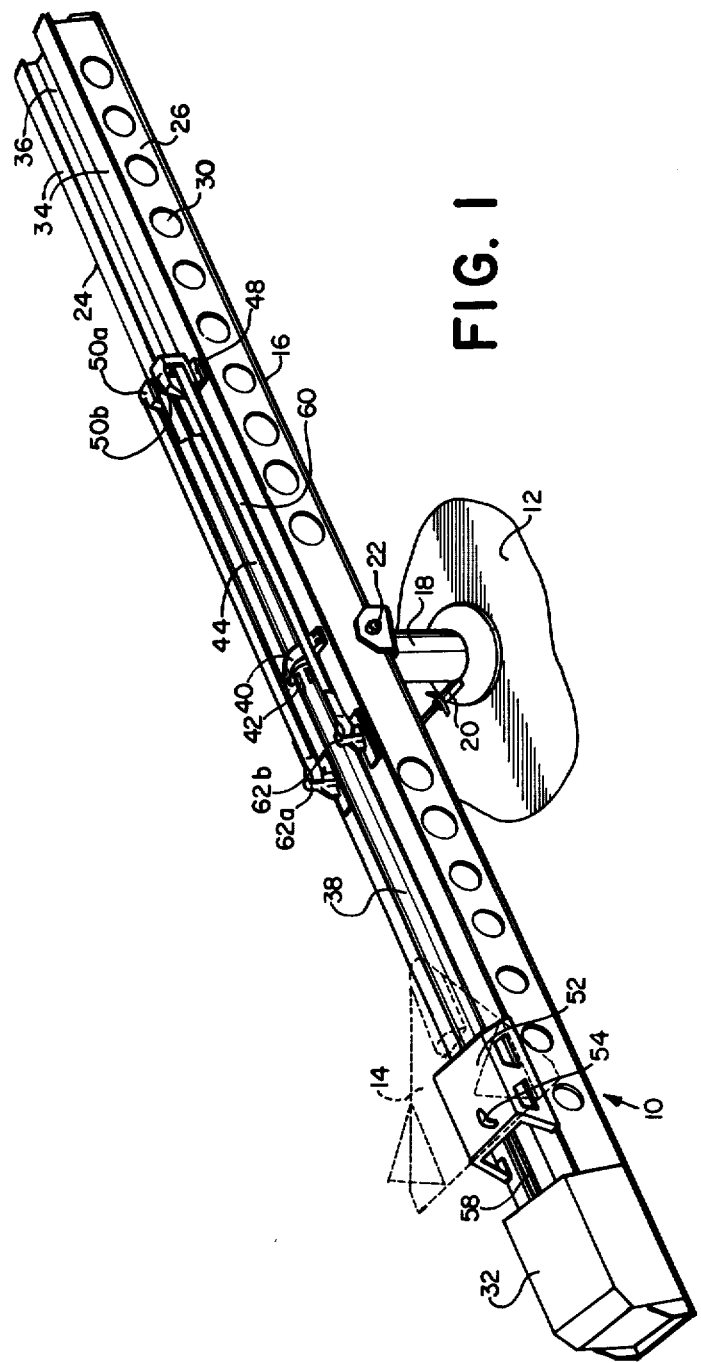
FIG. 1 is a perspective view of an aircraft launcher according to the present invention shown in battery position prior to launch.

In FIG. 1, there is shown an aircraft launcher 10 mounted upon a horizontal platform 12, such as the deck of a ship, and prepared to launch an aircraft 14 (shown in dotted outline), typically a lightweight, remotely pilotted vehicle. An elongated frame 16 is secured to platform 12 upon a support post 18 which may be rotatable and vertically adjustable to vary launch direction. A link rod 20 interconnects the base of support post 18 with the bottom of frame 16 and is adjustable in length to vary the angle of inclination of the frame. A mounting shaft 22 laterally penetrates the lower portion of frame 16 approximately midway along the length thereof and rotatably connects the frame to support post 18.

Frame 16 is a rigid, lightweight structure having a track 24 formed along the top surface thereof. The track 24 is supported by a pair of side panels 26 that parallelly extend the length of the frame and connect along the lower edges thereof to the bottom of frame 16. The side panels 26 have a series of holes 30 therein along their lengths to lighten the structure and ease maneuverability of the frame 16. Housing 32 abuts the rear end of track 24 between side panels 26 and encloses conventional pneumatic equipment and controls (not shown) for powering the launcher 10.

Track 24 longitudinally traverses the top of frame 16 and includes a pair of rails 34 parallelly situated on either side of the frame. Rails 34 are formed of a flat, wear-resistant material, such as steel, and extend forward along the length of frame 16 from housing 32. An elongated channel 36 having substantially the same length as rails 34 and a longitudinal axis substantially parallel thereto is interposed between the rails. The rails 34 are fastened along the top of the channel 36 on each side thereof so that the inner edges of the rails project slightly into the channel, as better shown in FIG. 5. Both the rails 34 and the channel 36 are rigidly attached to the launch frame 16 along the top edges of side panels 26 so that the outer edges of the rails extend laterally on both sides of the frame.

A launch tube 38 is formed of a rigid, cylindrical material, such as steel, and is longitudinally mounted within channel 36 for approximately half the length of frame 16. One end of tube 38 is connected at the rear of frame 16 to housing 32 wherein the chamber of the launch tube is connected to the pneumatic equipment of launcher 10 by conventional means. A rigid cap member 40 fits over the forward end of launch tube 38 about midway along the length of frame 16 and is attached to the inner edges of rails 34 to maintain the launch tube within channel 36 with the longitudinal axis of the launch tube midway between and parallel to rails 34. A plurality of slots 42 transfixed about the launch tube 38 near the forward end thereof vent the chamber of the launch tube to the atmosphere and permits pneumatic pressure delivered to the chamber during the launch stroke to be exhausted as the launcher enters its brake stroke.

A piston rod 44 is fabricated from a material similar to that of launch tube 38 and is formed to concentrically fit within and slidingly travel the length of the chamber of the launch tube when the pneumatic pressure is applied to the inward end of the rod. A crosshead 48, described in greater detail hereinafter, is rigidly connected at the outward end of piston rod 44 and slidingly attached to launch track 24 along the inner edges of rails 34 thereby permitting the crosshead to travel along the track in conjunction with longitudinal movement of the piston rod. A pair of sheaves 50a and 50b are laterally spaced apart and rotatably mounted in upright positions at the front of crosshead 48 so that the sheaves have parallel axes of rotation.

Figure 6:
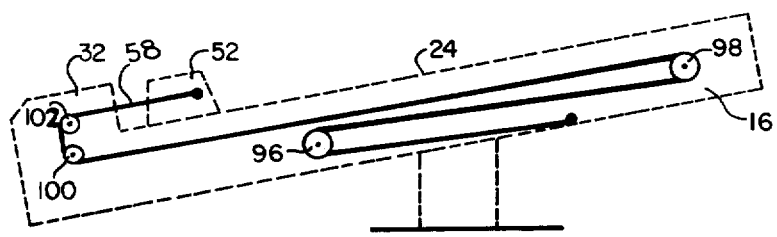
FIG. 6 is a schematic side view of the launcher of FIG. 1 to illustrate a return system for the shuttle.

A shuttle 52, shown in FIG. 1 in the battery position and described in greater detail hereinafter in regard to FIG. 3, slidingly engages track 24 along the outer edges of rails 34 to permit the shuttle to travel along frame 16. Shuttle 52 is designed to be accelerated forward along track 24 during the launch stroke, at the end of which the aircraft 14 is launched as the shuttle is decelerated and stopped near the forward end of frame 16. Bracket 54 attached to the top of shuttle 52 engages the bottom of aircraft 14 and maintains the aircraft aboard the shuttle during the launch stroke. An elasticized cord 58 is attached at one end thereof to shuttle 52 and, as shown in FIG. 6, and described in greater detail hereinafter, is routed within frame 16 and secured at the other end thereof to the bottom of the frame in order to return the shuttle to the battery position after launch.

A length of tape 60 operatively interconnects frame 16, crosshead 48, and shuttle 52 whereby accelerating the shuttle forward during the launch stroke in accordance with the linear translation of piston rod 44 before arresting the rod, shuttle, and crosshead during the brake stroke. Tape 60 is fabricated of a high strength, woven fiber material having a modulus of elasticity, such as nylon, so that the tape can reliably pull the shuttle 52 and aircraft 14 forward to a launch velocity during the launch stroke, and effectively absorb the high impact loads of the shuttle and the other unlaunched moving parts in the brake stroke. Tape 60 is connected at its respective ends to a pair of anchor blocks 62a and 62b which are bolted to track 24 on respective rails 34 at a longitudinal position just rearward of the middle of frame 16. From the anchor blocks 62a and 62b, the tape 60 is parallely extended forward along track 24 to crosshead 48 wherein the tape is reeved around each of the rotatable sheaves 50a and 50b forming a pair of loops thereabout. The tape 60 is then routed backward along frame 16 from the sheave 50a, 50b to the shuttle 52 wherein the tape is passed through a pair of opposed forward and rear arcuate members 64a and 64b, shown more clearly in FIGS. 2A and 2B, at the forward end of the shuttle. The reeving arrangement of the tape 60 around the sheaves 50a, 50b and through the shuttle 52 permits the shuttle to be pulled forward along track 24 at twice the velocity as that of piston rod 44 and crosshead 48 by a towing force applied by the tape and symmetrically distributed about forward arcuate member 64a to prevent jamming of the shuttle along the track during the launch stroke. During the brake stroke, the tape 60 exerts an arresting force upon rear arcuate member 64b and acts to absorb the kinetic energies of the decelerating shuttle 52, piston rod 44, and crosshead 48 to brake those unlaunched moving parts.

Referring now to FIGS. 2A and 2B, the launcher 10 is powered by pneumatic pressure stored within frame 16 and operatively connected to be delivered to the chamber of launch tube 38 by conventional fluid controls located within housing 32. Prior to delivery of the pneumatic pressure to launch tube 38, the launcher 10 is in the battery position, shown in FIG. 2A, wherein the shuttle 52 is disposed along track 24 to the rear of frame 16. Piston rod 44 is longitudinally mounted within launch tube 38 thereby positioning crosshead 48 forward of launch cap 40 near the longitudinal middle of track 24. Tape 60 is routed from anchor blocks 62a, 62b forward to crosshead 48 wherein the tape is reeved around the pair of sheaves 50a, 50b before being looped backward along frame 16 to the shuttle 52. The tape 60 is reevingly coupled to the shuttle 52 at the forward end thereof through the opposed arcuate members 64a and 64b fixed to the shuttle along the longitudinal center line thereof so that when the pneumatic pressure is delivered to launch tube 38 to initiate the launch stroke, the shuttle is pulled forward at twice the velocity of crosshead 48 by a towing force that acts centrally upon the shuttle about forward arcuate member 64a to prevent jamming of the shuttle along the track.

In the braked position of FIG. 2B, the piston rod 44 has moved outward from the launch tube 38 with the inward end of the rod located just forward of the slots 42 to exhaust the pneumatic pressure within the tube. In conjunction with the forward translation of the piston rod 44, the crosshead 48 has slidingly traveled along rails 34 to a position near the end of frame 16. Shuttle 52, adapted to slide along the rails 34 and over the crosshead 48, has moved forward of the crosshead along the rails and is stopped at the end of frame 16 by the tape 60. The tape 60 is fully extended forward from anchor blocks 62a, 62b about the rear arcuate member 64b at the front of the shuttle 52 to absorb the forward inertias of the piston rod 44, crosshead 48, and shuttle. The elasticized cord 58 is stretched along frame 16 by the forward translation of shuttle 52 and is prepared to return the shuttle along track 24 to the battery position.

Figure 3:
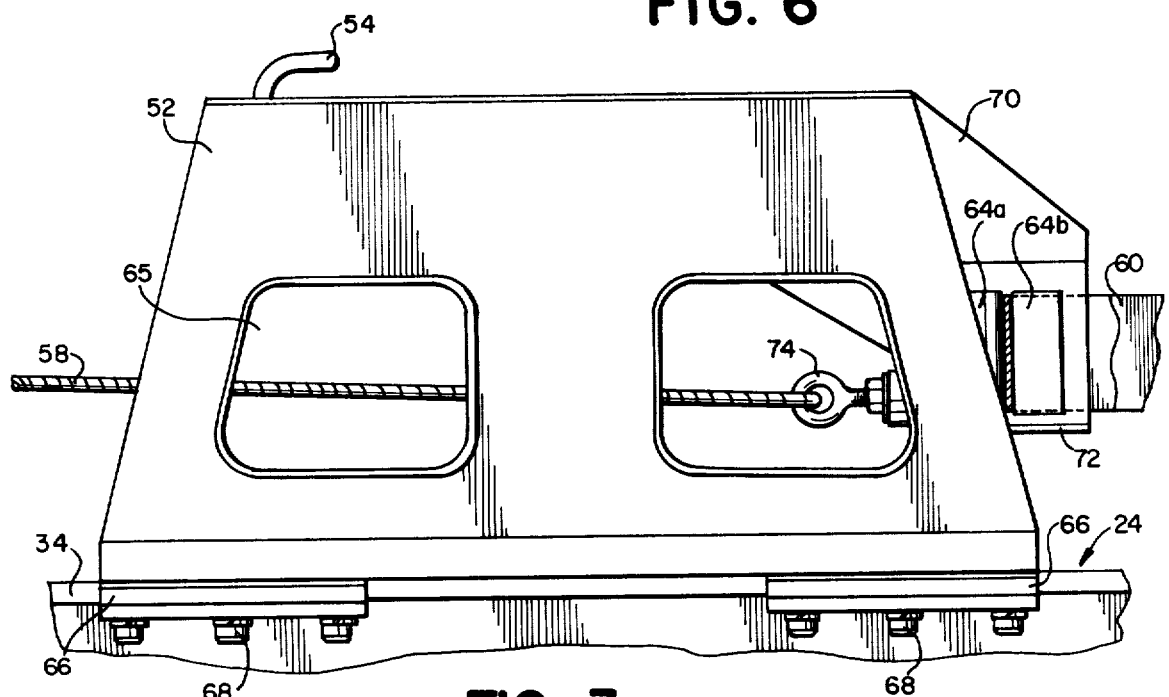
FIG. 3 is a side view in elevation of the shuttle of the launcher shown in FIG. 1.

Shuttle 52, shown in FIG. 3 upon track 24 in the battery position, is a raised platform constructed of a rigid, lightweight material, such as aluminum, and has a pair of openings 65 in each side thereof to further reduce its weight. Slipper pads 66 are mounted in pairs and parallely spaced apart at the front and rear of the base of shuttle 52 on opposite sides thereof for engaging the outer edges of rails 34 between each pair of pads. Each pad 66 is fabricated from a smooth, durable material, such as a hardened phenolic resin, and is flatly formed to permit unrestricted sliding travel along track 24. A plurality of screws 68 are threadingly engaged to the base of shuttle 52 through each pair of pads 66 to permit adjustment of the spaces therebetween.

A support arm 70 is rigidly attached at the front of shuttle 52 along the longitudinal center line thereof and is diagonally disposed downward in a forward direction. Opposed arcuate members 64a and 64b are fixed to the bottom of support arm 70 along the longitudinal center line of shuttle 52 and spaced apart to permit sliding passage therethrough of tape 60. A keeper plate 72 is removably connected across the bottoms of arcuate members 64a and 64b to ease assembly and disassembly of the tape 60 to shuttle 52 and to assure confinement of the tape between the arcuate members during operation. A ring member 74 is threadingly connected to support arm 70 within shuttle 52 and provides the point of attachment for the elasticized cord 58 so that the shuttle can be returned to the battery position after launching and braking. Bracket member 54 is formed to engage the bottom of aircraft 14 and is attached to the top of shuttle 52 to maintain the position of the aircraft upon the shuttle during the launch stroke.

Figure 4:
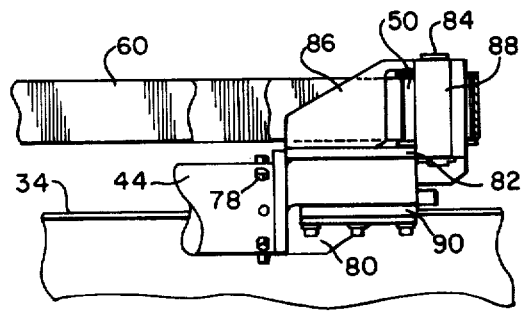
FIG. 4 is a side view in elevation of the crosshead of the launcher shown in FIG. 1.
Figure 5:
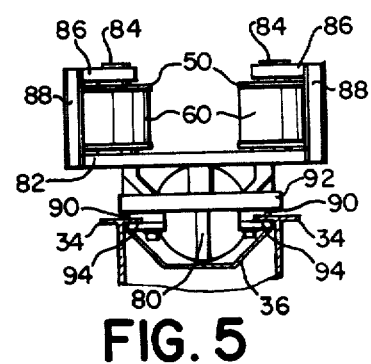
FIG. 5 is a frontal view in elevation of the crosshead shown in FIG. 4.

Referring now to FIGS. 4 and 5, crosshead 48 is connected to the outward end of piston rod 44 by a series of fasteners 78 so that the crosshead moves in accordance with linear translation of the piston rod. The crosshead 48 is a rigid, lightweight structure including a base plate 80 formed at one end to engage the outward end of piston rod 44 and attached thereto by the fasteners 78 so that the base plate is vertically oriented within channel 36. A top plate 82 is perpendicularly attached along the longitudinal center line thereof to the top edges of base plate 80 so that the top plate extends equally to each side over rails 34. The pair of sheaves 50a, 50b are laterally spaced apart along the upper surface of top plate 82 at the front portion thereof, and are rotatably mounted in upright positions on the top plate about pins 84. Pins 84 are parallely attached at the lower ends thereof to top plate 82 and are axially positioned through the sheaves 50a and 50b to provide the sheaves with parallel axes of rotation. A pair of clasps 86 engage the top of pins 84 and are attached along top plate 82 behind each sheave 50 to maintain the parallel positions of the pins within the sheaves. Angled plates 88 extend between the top plate 82 and the upper portions of clasps 86 and are connected therebetween at each of the forward corners of crosshead 48 to retain the tape 60 to the crosshead as the shuttle 52 passes over and through the crosshead during the brake stroke. Slipper pads 90 for slidingly coupling the crosshead 48 to rails 34 are made of a similar material as the shuttle pads 66 and are coupled to the top plate 82 by a connecting bar 92 mounted beneath the top plate. The pads 90 have elongated slots 94 formed therein and are mounted to the bottom of the connecting bar 92 with the slots facing outward from base plate 80 to engage the inner edges of rails 34. It should be noted that the engagement of the rails 34 within the slots 94 of slipper pads 90 properly positions the piston rod 44 within channel 36 and elevates the sheaves 50 to a level substantially the same as that of the opposed arcuate members 64a and 64b on shuttle 52.

Referring now to FIG. 6, the elasticized cord 58 employed to return the shuttle 52 back along track 24 to the battery position is made of a highly elastic material, such as rubber, and is fabricated of considerable length, preferably about two to three times the length of track 24, to improve the elastic capability of the cord. One end of the cord 58 is attached to the bottom of frame 16 on the inside thereof, and the cord is extended rearwardly therefrom to a sheave 96 rotatably coupled to the frame. The cord 58 is looped around sheave 96 and routed diagonally forward through frame 16 to a sheave 98 rotatably coupled to the frame near the front end thereof. After being looped around sheave 98, the elasticized cord 58 is then routed rearwardly through frame 16 beneath track 24 to a pair of sheaves 100 and 102 that are centrally mounted within housing 32 and vertically positioned therein to guide the cord upward to a level above the track. The cord 58 leaves sheave 102 and passes outward from housing 32 to the shuttle 52 wherein the opposite end of the cord is connected to provide a drawing force on the shuttle.

In the battery position, the elasticized cord 58 draws lightly upon the shuttle 52 to properly locate the shuttle along the track 24. During the launching and braking phases of operation, the cord 58 is stretched along frame 16 by the forward-moving shuttle 52 so that at the end of the brake stroke, the cord exerts a drawing force sufficient to return the shuttle, along with the crosshead 48 and piston rod 44 that are coupled to shuttle by the tape 60, backward along track 24 to the battery position. It should be noted that after launching, residual pressure within launch tube 38 dampens the drawing force of the elasticized cord 58 to provide a safe rate of return for the unlaunched parts. In addition, an exhaust valve (not shown) may be connected to the chamber of launch tube 38 to vary the bleed-off rate of the residual air pressure and thereby control the rate of return.

Referring now to FIGS. 7A through 7D, the operational sequence of the launcher according to the present invention is depicted in various stages thereof. In FIG. 7A shuttle 52 and crosshead 48 are operatively connected by tape 60 in the battery position along the longitudinal axis L of the launcher frame. Tape 60 is reevingly routed from the anchor blocks 62a and 62b, around sheaves 50a and 50b, and between arcuate members 64a and 64b to couple the shuttle 52 to the crosshead 48 for launcher operation. As the crosshead 48 is powered forward along axis L during the launch stroke, depicted in FIG. 7B, a pulling force is distributed along tape 60 about sheaves 50a and 50b and symmetrically applied along the curved inner surface of member 64a to tour the shuttle 52 in a straight line along the axis at twice the velocity of the crosshead. The shuttle 52 reaches the crosshead 48 near the end of the launch stroke, depicted in FIG. 7C, and the aircraft is launched as the arcuate members 64a and 64b pass between sheaves 50a and 50b and the tape 60 is transferred from the forward member 64a to the rear member 64b. The transfer of tape 60 between the opposed arcuate members 64a and 64b initiates the braking of shuttle 52 by the tape through the application of an arresting force upon the rear arcuate member. Forward inertia of shuttle 52 carries it beyond the crosshead 48 so that at the end of the brake stroke, depicted in FIG. 7D, the tape 60 is fully extended forward from anchor blocks 62a and 62b by arcuate member 64b thereby absorbing the kinetic energies of the shuttle, crosshead, and piston rod 44 to arrest their forward movement for subsequent return to the battery position.

Therefore, it is apparent that the disclosed launcher provides an improved system for launching lightweight aircraft by accelerating the aircraft in a smooth uninterrupted manner to the required launch speed, after which the unlaunched moving parts of the launcher are effectively arrested with a built-in braking capability. In addition, the present invention provides a simple yet reliable launching system that is lightweight and easy to maneuver. Furthermore, the disclosed launcher is durable in structure and can be economically manufactured.

Obviously, other embodiments and modifications of the present invention will readily come to those of ordinary skill in the art having the benefit of the teachings presented in the foregoing description and drawings. Therefore, it is to be understood that this invention is not to be limited thereto, and that said embodiments and modifications are intended to be included within the scope of the appended claims.

What is claimed is:

1. A system for launching an aircraft, comprising:
   a track extended longitudinally between a forward and a rearward end;
   a shuttle adapted to advance along said track from the rearward to the forward end thereof;
   a crosshead positioned intermediate the ends of said track forward of said shuttle and adapted to be driven longitudinally along said track to a position intermediate the ends thereof rearward of said shuttle; and
   a strip of energy-absorbing tape fixed at its ends to said track rearward of said crosshead and reeved through said crosshead and said shuttle for advancing and shuttle along said track with forward movement of said crosshead and for braking said shuttle forward of said crosshead at the forward end of said track.

2. A launching system according to claim 1 wherein:
   said shuttle is provided with a pair of opposed arcuate surfaces aligned longitudinally with said track;
   said crosshead is provided with a pair of rotating sheaves aligned transversely with said track; and
   said tape is routed from its fixed ends around forward surfaces of said sheaves, when said crosshead is forward of said shuttle, and between the arcuate surfaces for continuously interconnecting said shuttle and said crosshead with said tape.

3. A launching system according to claim 2, further comprising:
   an elasticized cord operatively connected to said shuttle for drawing said shuttle rearward from the forward end of said track.

4. A system for launching an aircraft, comprising:
   a track to guide launch direction;
   shuttle means adapted to carry the aircraft and slidingly connected to said track;
   piston means operatively connected to move along said track for driving said shuttle means forwardly therealong; and
   a strip of energy-absorbing tape fixed at its ends to said track and reevingly connected between said piston means and said shuttle means for accelerating said shuttle means concomitantly with acceleration of said piston means and for braking said shuttle means forward of said piston means, said strip of tape having a taut length for positioning said piston means and said shuttle means forward and aftward, respectively, of the ends of said tape in a battery position of the launching system, and an extended length for positioning said shuttle means forward of said piston means near the forward end of said track.

* * * * *